US012494579B2

(12) United States Patent
Cui et al.

(10) Patent No.: US 12,494,579 B2
(45) Date of Patent: Dec. 9, 2025

(54) LOW-PROFILE DUAL-BAND APERTURE-SHARED ANTENNA BASED ON STRUCTURE REUSING AND COMMUNICATION DEVICE THEREOF

(71) Applicant: SOUTH CHINA UNIVERSITY OF TECHNOLOGY, Guangzhou (CN)

(72) Inventors: Yuehui Cui, Guangzhou (CN); Quan Xue, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/007,509

(22) Filed: Jan. 1, 2025

(65) Prior Publication Data

US 2025/0141104 A1 May 1, 2025

Related U.S. Application Data

(63) Continuation of application No. PCT/CN2024/105431, filed on Jul. 15, 2024.

(30) Foreign Application Priority Data

Sep. 21, 2023 (CN) ........................ 202311218240.4

(51) Int. Cl.
*H01Q 5/385* (2015.01)
*H01Q 5/48* (2015.01)
(Continued)

(52) U.S. Cl.
CPC ............... *H01Q 5/385* (2015.01); *H01Q 5/48* (2015.01); *H01Q 15/0013* (2013.01); *H01Q 21/062* (2013.01); *H01Q 25/001* (2013.01)

(58) Field of Classification Search
CPC ............ H01Q 1/38; H01Q 5/38; H01Q 5/385; H01Q 5/48; H01Q 15/00; H01Q 15/0013;
(Continued)

(56) References Cited

U.S. PATENT DOCUMENTS 9,831,557 B2 * 11/2017 Park ..................... H01Q 9/0428
10,461,428 B2 * 10/2019 Jeong ..................... H01Q 5/385
(Continued)

FOREIGN PATENT DOCUMENTS

CN 109524788 A 3/2019
CN 110233335 A 9/2019
(Continued)

OTHER PUBLICATIONS

Yang Sheng Jie, Research on Filtering and Electromagnetic-Transparent Antennas and Dual-Band Aperture-Shared Base Station Antenna Arrays for 5G/B5G Applications, I-VIII, 1-168, (abstract starts at III) Wanfang dissertation database. Date of issue: Apr. 15, 2023. Related pages. Text p. 52-146 Claims involved: 1-8.
(Continued)

*Primary Examiner* — Tho G Phan
(74) *Attorney, Agent, or Firm* — Pilloff Passino & Cosenza LLP; Rachel K. Pilloff; Sean A. Passino

(57) ABSTRACT

Provided are a low-profile dual-band aperture-shared antenna based on structure reusing and a communication device, including a metasurface structure, rectangular parasitic strips, a high-frequency radiating element and a reflecting plate, where the high-frequency antenna radiating element is arranged above the reflecting plate, the metasurface structure is arranged above the high-frequency antenna radiating element, and the rectangular parasitic strips are arranged above the high-frequency antenna radiating element and located below the metasurface structure.

8 Claims, 13 Drawing Sheets

(51) Int. Cl.
*H01Q 15/00* (2006.01)
*H01Q 21/06* (2006.01)
*H01Q 25/00* (2006.01)

(58) Field of Classification Search
CPC ...... H01Q 21/06; H01Q 21/062; H01Q 25/00; H01Q 25/001; H01Q 1/36; H01Q 1/52; H01Q 5/10; H01Q 5/20; H01Q 3/30; H01Q 3/307; H01Q 5/37; H01Q 5/378; H01Q 9/16; H01Q 15/24; H01Q 19/10
See application file for complete search history.

(56) References Cited

U.S. PATENT DOCUMENTS

| | | | | |
|---|---|---|---|---|
| 11,217,896 | B2 * | 1/2022 | Legay | H01Q 5/28 |
| 11,444,386 | B2 * | 9/2022 | Tripon-Canseliet | H01Q 15/0086 |
| 11,710,908 | B2 * | 7/2023 | Cao | H01Q 1/521 343/702 |
| 11,929,563 | B2 * | 3/2024 | Leung | H01Q 9/0485 |
| 12,212,066 | B2 * | 1/2025 | Shepeleva | H01Q 15/0086 |
| 2010/0171675 | A1 | 7/2010 | Borja et al. | |
| 2024/0243482 | A1 | 7/2024 | Xue et al. | |

FOREIGN PATENT DOCUMENTS

| | | | |
|---|---|---|---|
| CN | 112366443 | A | 2/2021 |
| CN | 112599972 | A | 4/2021 |
| CN | 113922049 | A | 1/2022 |
| CN | 115764251 | A | 3/2023 |
| CN | 115863960 | A | 3/2023 |
| CN | 219040719 | U | 5/2023 |
| CN | 116960637 | A | 10/2023 |
| WO | 2022242014 | A | 11/2022 |

OTHER PUBLICATIONS

Retrieval report dated Nov. 2, 2023 in SIPO application No. 202311218240.4.

Retrieval report dated Nov. 22, 2023 in SIPO application No. 202311218240.4.

Notification to Grant Patent Right for Invention dated Nov. 26, 2023 in SIPO application No. 202311218240.4.

Notice of first office action dated Nov. 3, 2024 in SIPO application No. 202311218240.4.

* cited by examiner

LOW-PROFILE DUAL-BAND APERTURE-SHARED ANTENNA BASED ON STRUCTURE REUSING AND COMMUNICATION DEVICE THEREOF

CROSS-REFERENCE TO RELATED APPLICATIONS

This application is a continuation of PCT/CN2024/105431, filed Jul. 15, 2024 and claims priority of Chinese Patent Application No. 202311218240.4, filed on Sep. 21, 2023, the entire contents of which are incorporated herein by reference.

TECHNICAL FIELD

The disclosure relates to the field of mobile communication, and in particular to a low-profile dual-band aperture-shared antenna based on structure reusing and a communication device.

BACKGROUND

With the continuous development of mobile communication technology, mobile communication technology has enriched people's lives. With the change of communication systems, there are various communication systems, and it is predicted that there will be a coexistence of various communication application standards for a long time to come. At present, there are 2nd-generation (2G), 3rd-generation (3G), 4th-generation (4G) and 5th-generation (5G) communication systems in use in China. Antenna is an important part of communication system, and the performance of the antenna directly affects the communication function of wireless system, so the research on multi-frequency antennas capable of supporting multiple standards at the same time has a strong application background. With the increase of communication frequency bands required by communication standards and the introduction of new communication technologies (such as Multiple-Input Multiple-Output (MIMO)). The number of antennas mounted on the same base station site is increasing, while the location of base stations is difficult and the antenna platform resources are tight, to solve the problem of how to place multiple frequency bands and multiple antennas in a limited space is of great research value.

In order to solve this problem, scholars have adopted the method of common-aperture fusion, that is, the antennas in different frequency bands are tightly put together, trying to make the antennas work normally in different frequency bands. When antennas working in different frequency bands are fused in the same aperture, impedance matching, port isolation and radiation performance will deteriorate due to mutual coupling. Some scholars use metasurface loading to solve the coupling problem in common-aperture, however, the antenna structure is increased and the wind resistance is increased. Further, some scholars have realized the common-aperture of the antenna by integrating the low-frequency antenna with the metasurface structure. In this kind of design, the overall section height of the antenna is usually $0.2\lambda_L$ (where $\lambda_L$ is the free space wavelength of the lowest frequency point of the low frequency), and there is still room for further antenna miniaturization to save the antenna platform space.

SUMMARY

In order to overcome the above shortcomings and deficiencies in the prior art, a primary objective of the disclosure is to provide a low-profile dual-band aperture-shared antenna based on structure reusing.

The disclosure multiplexes a metasurface structure as a part of a low-frequency antenna radiating element, so that the low-frequency antenna radiating element operates normally while at the same time solving the problem of high-frequency antenna radiation being blocked by the low-frequency antenna due to the high-frequency transmission characteristics of the metasurface structure.

The disclosure multiplexes a rectangular parasitic strip structure to broaden the low-frequency bandwidth while improving the high-frequency antenna gain, and ultimately realizes the common-aperture fusion of two broadband antennas operating in different frequency bands.

Another objective of the disclosure is to provide a communication device.

The objectives of the disclosure are achieved by a following technical scheme.

A low-profile dual-band aperture-shared antenna based on structure reusing, including a metasurface structure, rectangular parasitic strips, a high-frequency antenna radiating element and a reflecting plate, where the high-frequency antenna radiating element is arranged above the reflecting plate, the metasurface structure is arranged above the high-frequency antenna radiating element, the metasurface structure is arranged on a first surface of a dielectric substrate, and the rectangular parasitic strips are arranged on a second surface of the dielectric substrate, and the metasurface structure and the rectangular parasitic strips form a low-frequency antenna radiating element; and when the metasurface structure is excited, a coupling current appears on the rectangular parasitic strips, forming a resonance point in a low-frequency band of the antenna, improving impedance matching of the metasurface structure. In addition, the addition of the rectangular parasitic strips may restore the gain of the high-frequency radiation antenna element at 2-2.2 gigahertz (GHz).

In an embodiment, the metasurface structure is composed of M×N metasurface elements arranged in an array, where an array shape is square, and each of the metasurface elements is composed of a square ring and a square patch embedded in the square ring.

In an embodiment, the metasurface elements include first metasurface elements and second metasurface elements, where metasurface elements at four corners of the square are the first metasurface elements, and metasurface elements at other positions of the square are the second metasurface elements; and the metasurface structure uses a differential feed mode, specifically, each of the first metasurface elements is connected with an inner core of a coaxial line through a metal column, and the reflecting plate is connected with an outer core of the coaxial line to realize dual-polarization radiation.

In an embodiment, square patch sizes of the second metasurface elements and the first metasurface elements are different, and a transmission performance of the metasurface structure is controlled by adjusting the square patch sizes of the metasurface elements.

In an embodiment, each of the first metasurface elements is provided with an annular groove.

In an embodiment, the rectangular parasitic strips are four, and the four rectangular parasitic strips are rotationally symmetrically arranged around the metasurface structure.

In an embodiment, the high-frequency antenna radiating element, the metasurface structure, the four rectangular parasitic strips and the reflecting plate are symmetrical about the same axis.

In an embodiment, the high-frequency antenna radiating element is a dipole antenna.

In an embodiment, a height of the metasurface structure from the reflecting plate is $0.1\lambda_L$, where $\lambda_L$ is a free space wavelength of a lowest frequency point of low frequency.

A communication device, including the low-profile dual-band aperture-shared antenna.

Compared with the prior art, the disclosure has following advantages and beneficial effects.

Firstly, the frequency band of the disclosure covers two frequency bands of 860 megahertz (MHz)-960 MHz and 1700 MHz-2200 MHz, with gains of 9.5±1 dBi and 10±0.5 dBi respectively. Compared with other aperture-shared antennas, an overall section of the antenna according to the disclosure is only $0.1\lambda_L$ (35 millimeter (mm)) and has obvious advantages.

Secondly, the disclosure skillfully uses the high-frequency transmission characteristics of the metasurface structure to avoid the problem of concave radiation direction map in the common-aperture layout where the high-frequency antenna is blocked by the low-frequency antenna.

Thirdly, the metasurface structure according to the disclosure has a narrow operating bandwidth when operating as a low-frequency antenna, but the rectangular parasitic strips are set around the metasurface structure to add a resonance point, thus expanding the low-frequency antenna bandwidth. Meanwhile, the high-frequency gain starts to decrease at 2-2.2 GHz due to the addition of the metasurface structure, but the addition of the rectangular parasitic strips restores the gain at 2-2.2 GHz, thus ensuring the beam width of the high-frequency antenna.

Fourthly, the metasurface elements according to the disclosure include square patches and square rings. Under the condition of not changing the performance of the low-frequency antenna, the side length sizes of the square patches may be adjusted to realize the transmittance of the frequency band, which increases the degree of freedom of the antenna design, and the integration with other frequency bands may be realized by adjusting the side length size of the square.

Fifthly, according to the disclosure, the metasurface structure is arranged above the high-frequency antenna radiating element, so the metasurface structure may be used as capacitive loading of the high-frequency antenna to reduce the cross section of the high-frequency antenna, and finally achieve the overall cross section of the antenna of $0.1\lambda_L$, realizing the miniaturization of the antenna and saving the antenna platform space.

DETAILED DESCRIPTION OF THE EMBODIMENTS

The disclosure will be further described in detail with embodiments, but the embodiments of the disclosure are not limited thereto.

Embodiment 1

Figure 1:
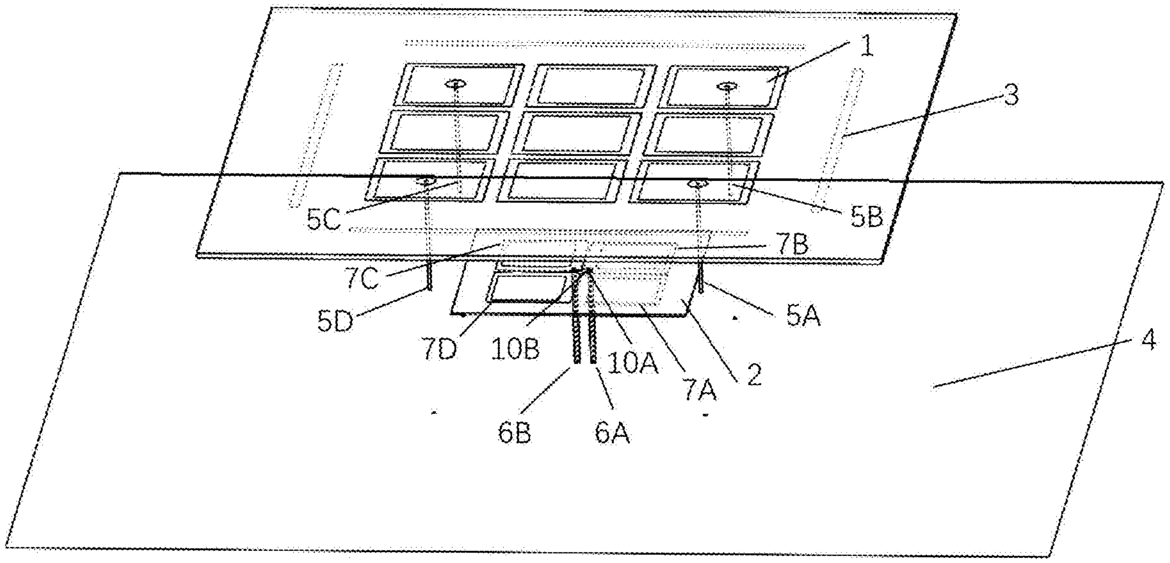
FIG. 1 is a structural schematic diagram of the disclosure.
Figure 2:
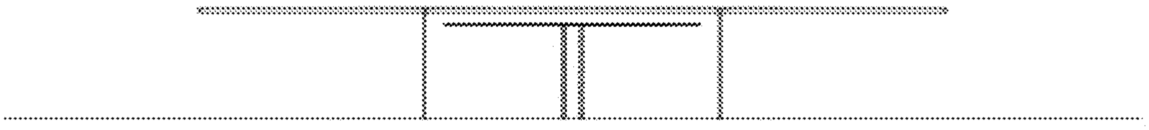
FIG. 2 is a front view of FIG. 1.
Figure 3:
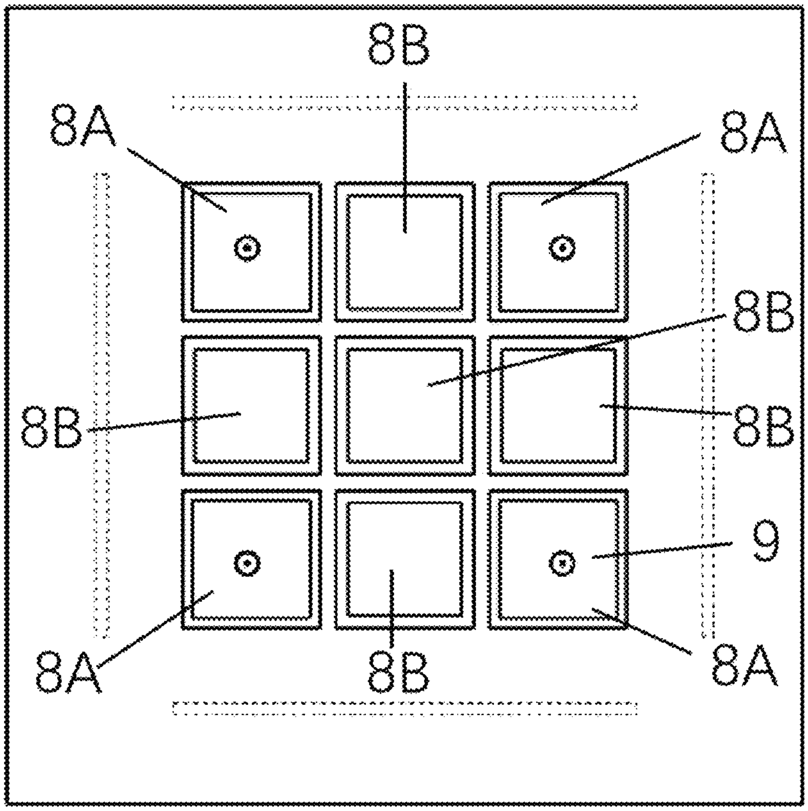
FIG. 3 is a top view of a metasurface structure after a high-frequency antenna radiating element in FIG. 1 is hidden.
Figure 4A:
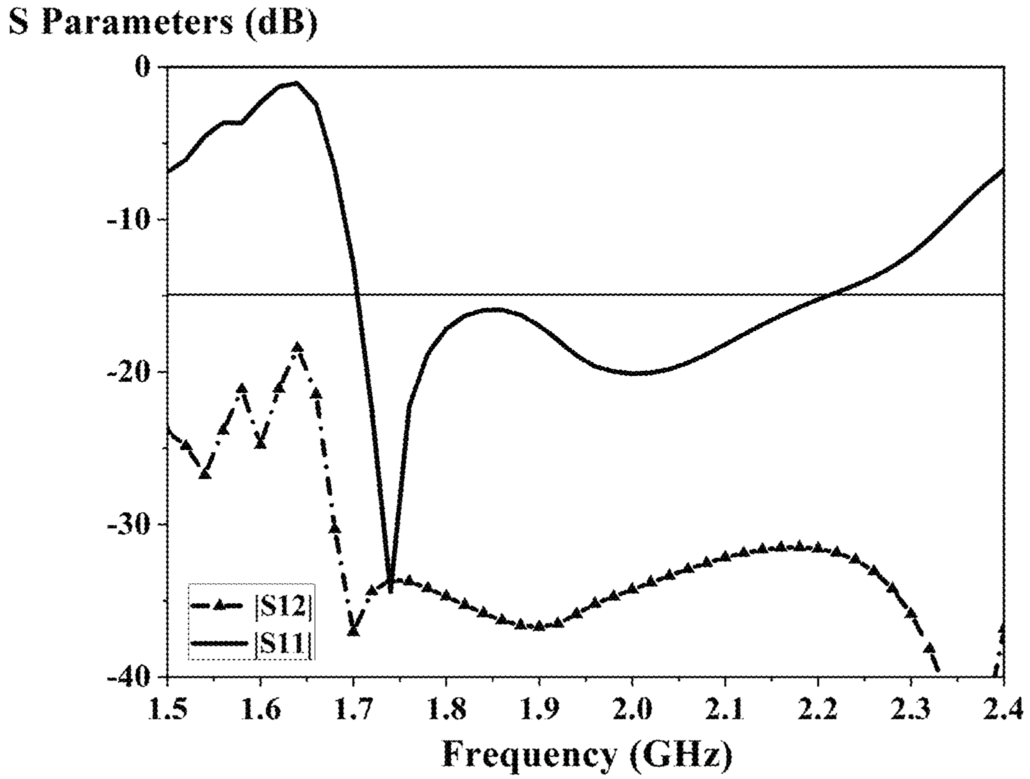
FIG. 4A is a schematic diagram of impedance matching of a high-frequency antenna radiating element in embodiment 1 of the disclosure.
Figure 4B:
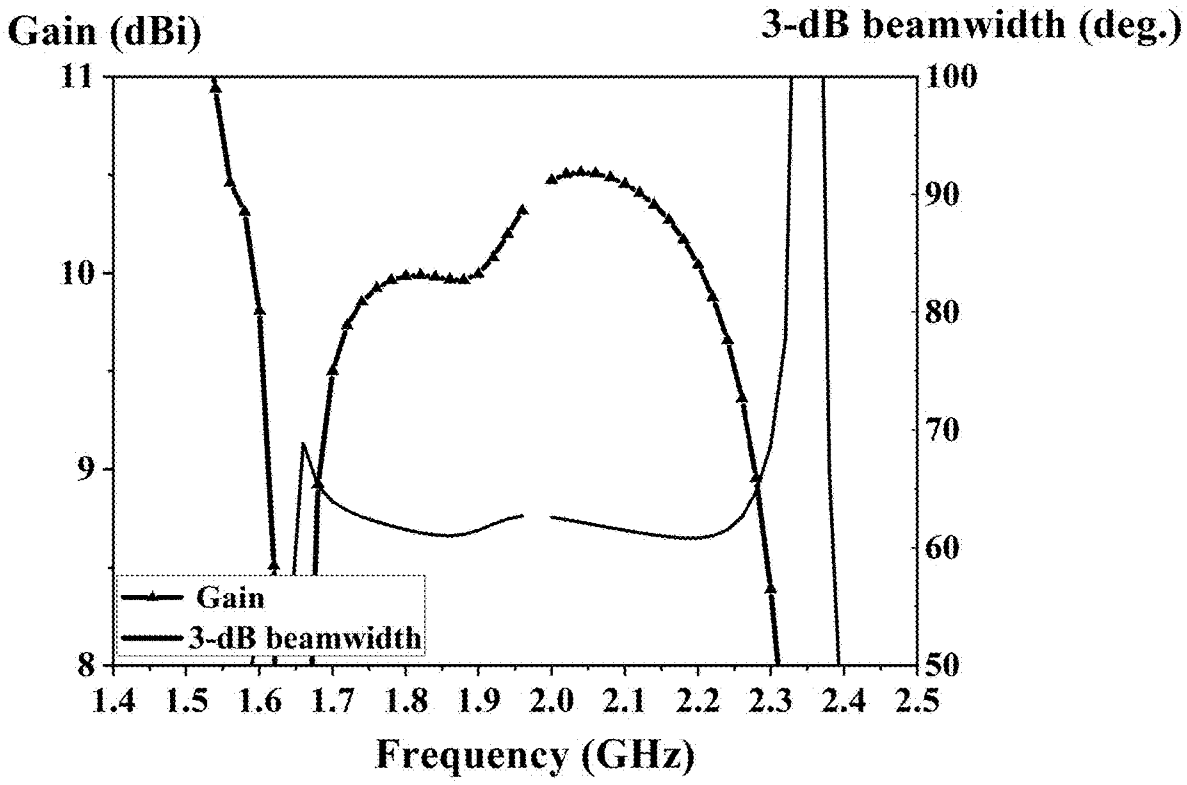
FIG. 4B is a schematic diagram of gain and half-power beam width of a high-frequency antenna radiating element in Embodiment 1 of the disclosure.
Figure 4C:
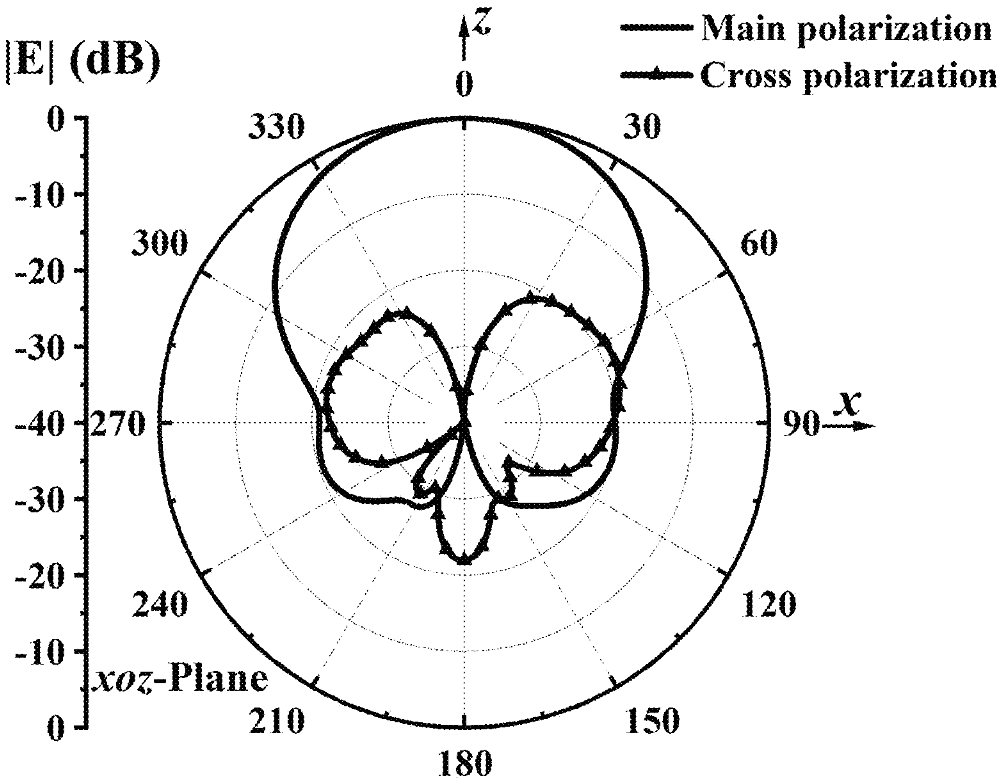
FIG. 4C is a directional diagram of a high-frequency antenna radiating element at 1.7 GHz in Embodiment 1 of the disclosure
Figure 4D:
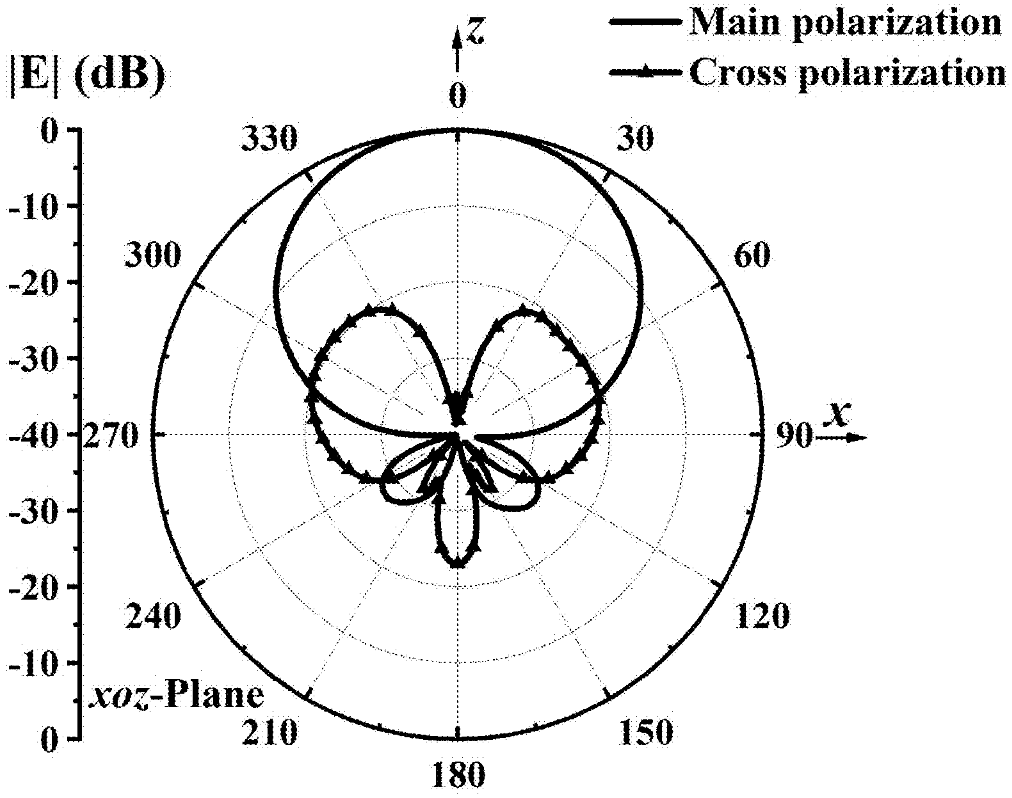
FIG. 4D is a directional diagram of a high-frequency antenna radiating element at 1.96 GHz in Embodiment 1 of the disclosure
Figure 4E:
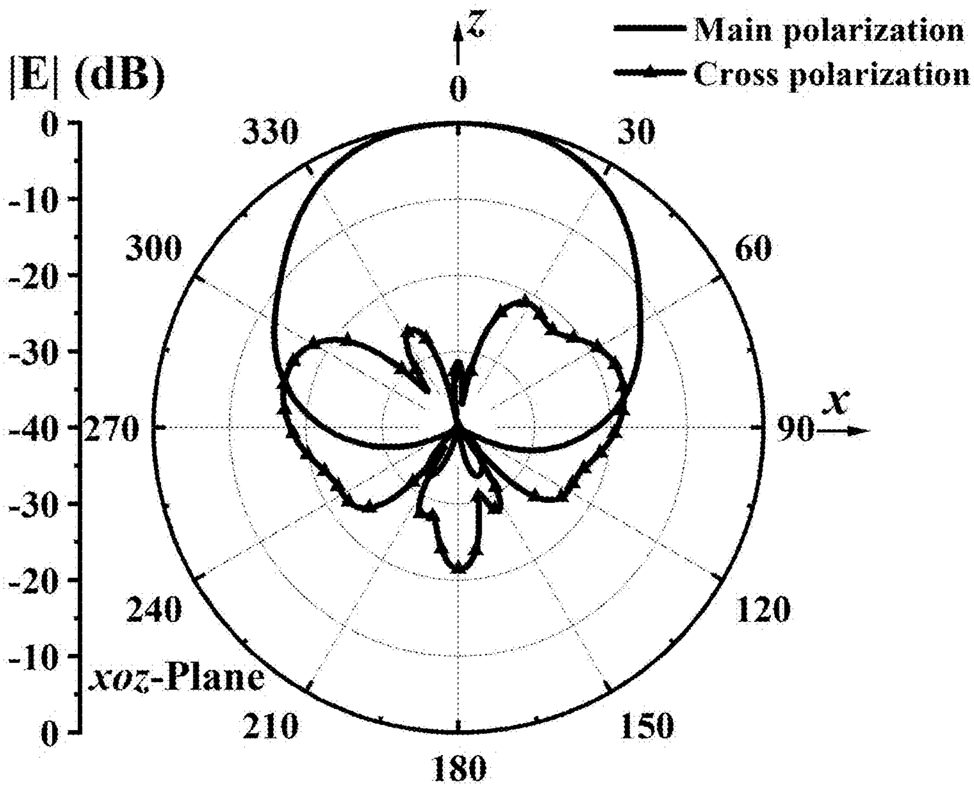
FIG. 4E is a directional diagram of a high-frequency antenna radiating element at 2.2 GHz in Embodiment 1 of the disclosure.
Figure 5A:
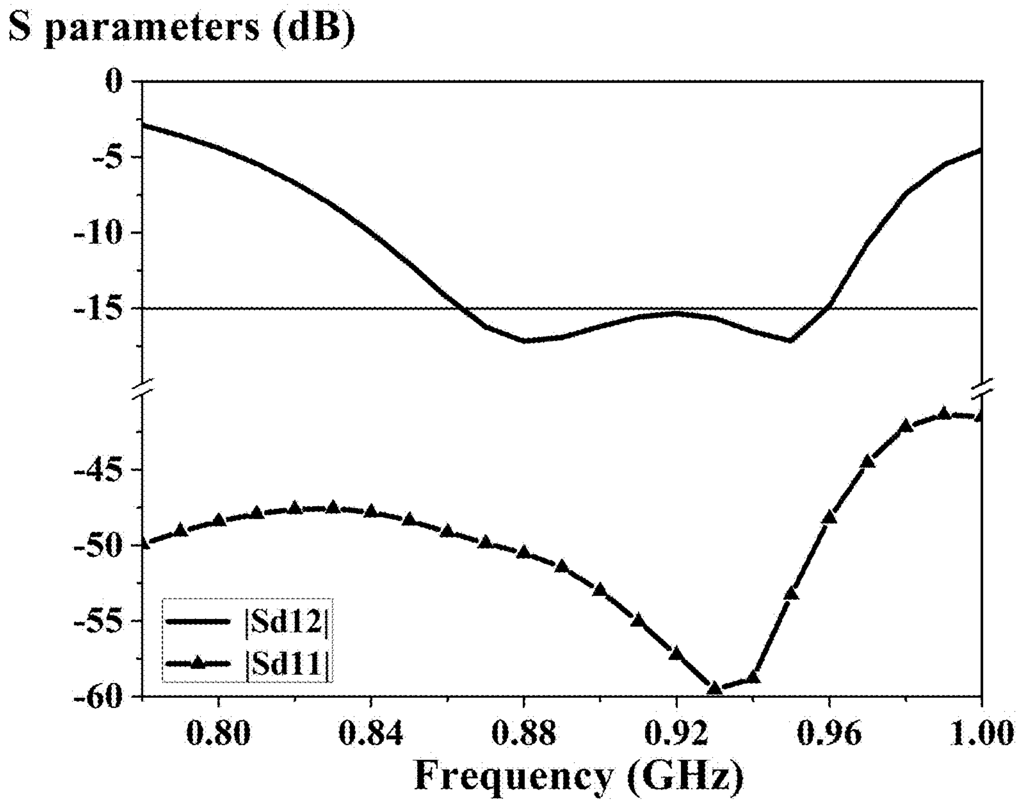
FIG. 5A is a schematic diagram of impedance matching of a low-frequency antenna radiating element in Embodiment 1 of the disclosure.
Figure 5B:
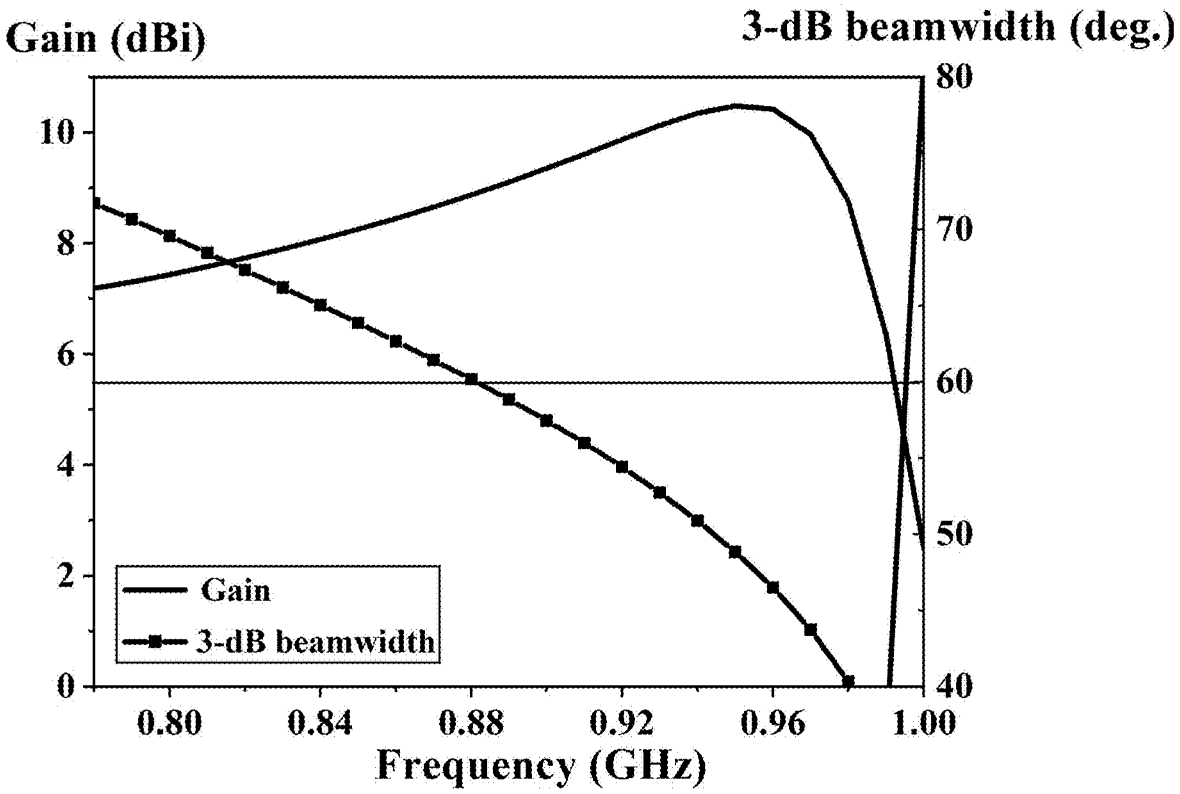
FIG. 5B is a schematic diagram of gain and half-power beam width of a low-frequency antenna radiating element in Embodiment 1 of the disclosure.
Figure 5C:
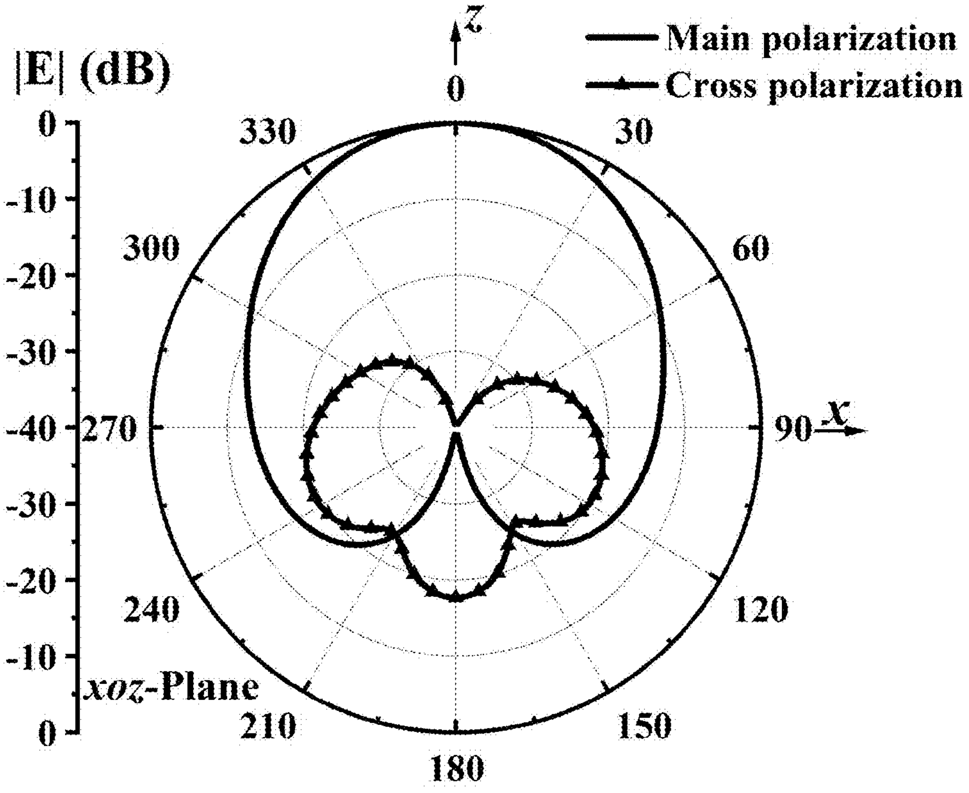
FIG. 5C is a directional diagram of a low-frequency antenna radiating element at 0.86 GHz in Embodiment 1 of the disclosure
Figure 5D:
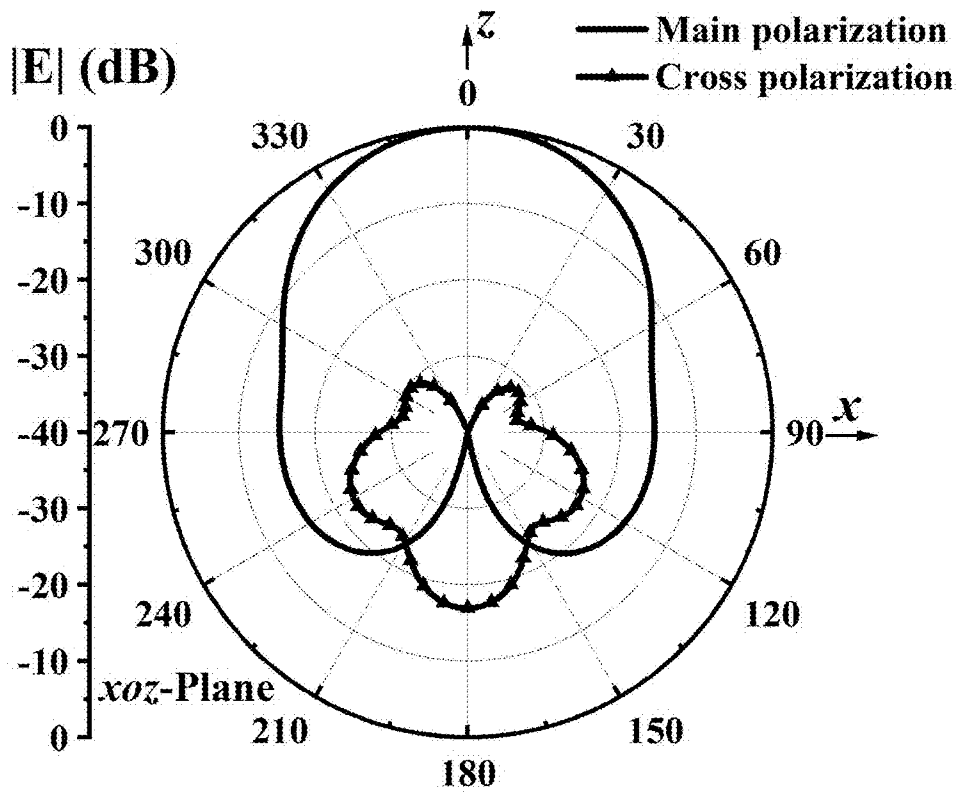
FIG. 5D is a directional diagram of a low-frequency antenna radiating element at 0.91 GHz in Embodiment 1 of the disclosure
Figure 5E:
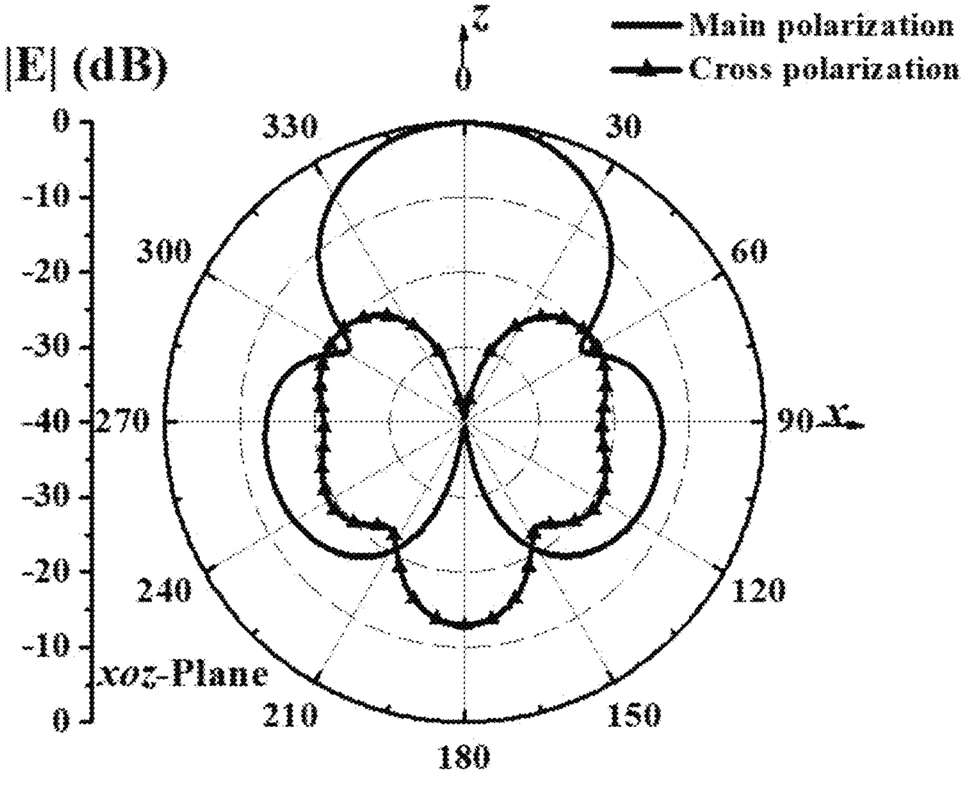
FIG. 5E is a directional diagram of a low-frequency antenna radiating element at 0.96 GHz in Embodiment 1 of the disclosure.

As shown in FIG. 1, FIG. 2, FIG. 3, a low-profile dual-band aperture-shared antenna based on structure reusing, including a metasurface structure 1, a high-frequency antenna radiating element 2, parasitic strips and a reflecting plate 4, where the parasitic strips are rectangular parasitic strips 3, the metasurface structure 1 and the rectangular parasitic strips 3 together form a low-frequency antenna radiating element.

In this embodiment, the high-frequency antenna radiating element 2 is placed above the reflecting plate 4 at a distance of 30 mm from the reflecting plate. The metasurface structure is placed 5.5 mm above the high-frequency antenna radiating element. A dielectric substrate of the metasurface structure has a relative dielectric constant of 3.55 and a thickness of 1.524 mm. A dielectric substrate of the high-frequency antenna radiating element has a relative dielectric constant of 2.2 and a thickness of 0.51 mm.

In an embodiment, the metasurface structure is arranged on a first surface of the dielectric substrate, and the rectangular parasitic strips are arranged on a second surface of the same dielectric substrate, where the first surface and the second surface are opposite surfaces. In this embodiment, the first surface is an upper surface of the dielectric substrate, and the second surface is a lower surface of the dielectric substrate.

Specifically, there are four rectangular parasitic strips, where the four rectangular parasitic strips are rotationally symmetrically arranged on the lower surface of the dielectric substrate and around the metasurface structure. An overall structure of the metasurface structure is square, and one rectangular parasitic strip is correspondingly arranged outside each side of the square.

This embodiment realizes dual-frequency common-aperture fusion of antennas. However, in the flower arrangement, when the high-frequency antenna radiating element is placed under the low-frequency antenna radiating element, because the low-frequency antenna radiating element is an electrically large-sized shield relative to the high-frequency antenna radiating element, the low-frequency antenna radiating element may generate radiation shielding to the high-frequency antenna radiating element in the high-frequency working frequency band, resulting in impedance matching mismatch and radiation pattern distortion of the high-frequency antenna radiating element. The distortion includes characterization sag, deflection and jitter ripple. In order to overcome the above defects, the disclosure skillfully designs the metasurface structure in the low-frequency antenna radiating element as an adjustable frequency selection surface with high-frequency transmission, so that the disclosure may realize the normal radiation of the high-frequency antenna radiating element without adding any other additional structures.

In this embodiment, the reflection coefficients of plane waves from lower surfaces to upper surfaces of the metasurface elements are mainly tested. If there is a concave point in a certain frequency band, it means that less energy is reflected at this frequency point, and most of the plane waves are successfully transmitted to the other side. It is generally believed that the closer the reflection coefficient is to 0, the less the wave may be transmitted, and the farther the reflection coefficient is from 0, the more the wave may be transmitted. When the reflection coefficient reaches below −10 dB, it means that 90% of the energy of plane waves is transmitted.

In this embodiment, an average reflection coefficient of two metasurface elements reaches −8 dB without loading the rectangular parasitic strips, thus achieving high transmission performance.

In addition, the disclosure controls the high-frequency transmission performance of the metasurface structure by adjusting a side length of a square patch to change the lowest frequency. Specifically, the larger the size of the square patch, the more the concave point moves to the low frequency, and the better the low-frequency transmission performance. When the metasurface structure according to the disclosure works as a partially reflecting surface, gains in some high-frequency bands are improved and maintained. However, at 2-2.2 GHZ, the gain of the antenna begins to roll off, and the gain and wave width of the antenna in the 2-2.2 GHz band are restored by loading the rectangular parasitic strips.

In this embodiment, when the metasurface structure is excited, a coupling current appears on the rectangular parasitic strips, where the coupling current of the rectangular parasitic strips is equivalent to a dipole, forming a resonance point at low frequency, and the length of the rectangular parasitic strips determines the resonant frequency of the antenna. The rectangular parasitic strips are capacitively loaded to improve the impedance matching of the metasurface structure.

In an embodiment, the metasurface structure is composed of M×N metasurface elements arranged in an array, where an array shape is square, realizing dual polarization at ±45°. In this embodiment, the square is preferred. The metasurface elements include square rings and square patches embedded in the square rings, and the metasurface elements have a symmetrical structure, which meet requirements of polarized waves in two directions for the high-frequency radiation antenna element and have the same transmittance.

Specifically, the metasurface elements include first metasurface elements 8A and second metasurface elements 8B, and square patch sizes of the first and second metasurface elements are different.

In an embodiment, the first metasurface elements are arranged at four corners of a square matrix, and the second metasurface elements are arranged at other positions of the square matrix except the four corners. By adjusting the square patch size of the second metasurface elements to be different from the square patch size of the first metasurface elements, the reflectivity of the frequency band may be changed, and the radiation performance and S parameters of the high-frequency antenna may be better restored without affecting the low-frequency performance.

In order to counteract the excessive inductance in the low-frequency antenna, each of the first metasurface elements 8A is provided with an annular groove 9, where a center of the annular groove is located at a junction of a coaxial inner diameter and the metasurface structure. By adjusting an inner diameter and an outer diameter of the annular groove, the impedance matching of the low-frequency antenna may be adjusted. In this embodiment, the inner diameter of the annular groove is 2.9 mm and the outer diameter is 3.02 mm.

Because the loading height of the metasurface structure not only affects the performance of the high-frequency antenna, but also affects the matching of the low-frequency antenna, this embodiment may not only ignore the influence on the performance of the high-frequency antenna, but also optimize the performance of the low-frequency antenna by opening the annular groove. The height of the metasurface structure and the loading distance of the reflecting plate may bring an inductive change to the impedance matching of the low-frequency antenna, but the impedance matching may be adjusted by the inner diameter and the outer diameter of the annular groove.

In this embodiment, the height of the lower surface of the dielectric substrate of the high-frequency antenna radiating element from the reflecting plate is 30 mm. The height of the metasurface structure from the reflecting plate is 35.5 mm, specifically $0.1\lambda_L$, where $\lambda_L$ is a free space wavelength of a lowest frequency point of low frequency.

The metasurface structure uses a differential feed mode realized by four coaxial lines and metal columns, where outer cores of the coaxial lines are all connected with the reflecting plate, and four inner cores are respectively connected with the four metal columns 5A, 5B, 5C and 5D. The four metal columns are also respectively connected with the first metasurface elements 8A at the four corners, where the metal column 5A and the metal column 5C form a pair of differential feeds. When the metal columns are fed with equal amplitude and opposite phase excitation, the low-frequency antenna radiates outward in a linear polarization mode of −45 degrees. The metal column 5B and the metal column 5D form another pair of differential feeds, forming 45-degree linear polarization.

In this embodiment, a preferred size of the metasurface structure is as follows.

The metasurface structure uses a mode of coplanar layout of 3×3 metasurface elements. Each of the metasurface elements consists of one square patch and one square ring. In this embodiment, the square ring of each of the first and second metasurface elements 8A, 8B has an inner side length size of 36.1 mm and an outer side length size of 36.3 mm, an element period of the metasurface element is 40.5 mm. and each of the first metasurface elements 8A has a square patch side length of 31 mm and each of the second metasurface elements 8B has a square patch side length of 29.8 mm.

The high-frequency antenna radiating element includes a first high-frequency radiating arm 7A, a second high-frequency radiating arm 7B, a third high-frequency radiating arm 7C, a fourth high-frequency radiating arm 7D, a high-frequency feeder structure 10A, a high-frequency feeder structure 10B, a coaxial line 6A and a coaxial line 6B. The first high-frequency radiating arm 7A, the second high-frequency radiating arm 7B and the high-frequency feeder 10B are printed on a lower surface of a high-frequency dielectric substrate, while the third high-frequency radiating arm 7C, the fourth high-frequency radiating arm 7D and the high-frequency feeder 10A are printed on an upper surface of the high-frequency dielectric substrate. The first high-frequency radiating arm 7A and the third high-frequency radiating arm 7C form a −45-degree polarized vibrator fed by the high-frequency feeder 10B, while the second high-frequency radiating arm 7B and the fourth high-frequency radiating arm 7D form a 45-degree polarized vibrator fed by the high-frequency feeder 10A. The two coaxial lines are respectively connected with the high-frequency feeders 10A and 10B.

The two high-frequency feeders are perpendicular to each other, and an intersection point is located at a center point of the high-frequency dielectric substrate.

The four high-frequency radiating arms have the same structure and are of the same size, and are all printed on the high-frequency dielectric substrate.

The high-frequency coaxial lines are perpendicular to the high-frequency feeder 10A and the high-frequency feeder 10B.

A working frequency band of the high-frequency antenna is 1700 MHZ-2200 MHZ, and a working frequency band of the low-frequency antenna is 860 MHZ-960 MHz.

FIG. 4A-FIG. 4E are diagrams showing the impedance bandwidth, isolation, gain and half-power beam width and direction of the high-frequency antenna in this embodiment. Within a bandwidth of 1700 MHz-2200 MHz, the high-frequency antenna according to the disclosure has a port isolation of more than 30 dB, a beam width stabilized within 60-65 degrees and a gain of 10±0.5 dBi.

FIG. 5A-FIG. 5E are diagrams showing the impedance bandwidth, isolation, gain and half-power beam width and direction of the low-frequency antenna in this embodiment. Within a bandwidth of 860 MHz-960 MHz, the low-frequency antenna according to the disclosure has a port isolation of more than 45 dB, a narrow beam width, and a gain of 9.5±1 dBi.

The dual-band aperture-shared antenna has characteristics of novel structure, simple operation, convenient manufacture and low profile.

Embodiment 2

A communication device, including the low-profile dual-band aperture-shared antenna based on a dual-function metasurface according to Embodiment 1, which sequentially includes a metasurface structure, rectangular parasitic strips, high-frequency antenna radiating elements and a reflecting plate from top to bottom.

The above-mentioned embodiments are the preferred embodiments of the disclosure, but the embodiments of the disclosure are not limited by the above-mentioned embodiments, and any other changes, modifications, substitutions, combinations and simplifications made without departing from the spirit and principle of the disclosure shall be equivalent replacement methods, which are included in the protection scope of the disclosure.

What is claimed is:

1. A low-profile dual-band aperture-shared antenna based on structure reusing, comprising a metasurface structure, a high-frequency antenna radiating element and a reflecting plate, wherein the high-frequency antenna radiating element is arranged above the reflecting plate, the metasurface structure is arranged above the high-frequency antenna radiating element, the metasurface structure is arranged on a first surface of a dielectric substrate, and rectangular parasitic strips are arranged on a second surface of the dielectric substrate, and the metasurface structure and the rectangular parasitic strips form a low-frequency antenna radiating element;

the rectangular parasitic strips are used to restore a gain of the high-frequency antenna radiating element at 2-2.2 GHz;

the metasurface structure is composed of M×N metasurface elements arranged in an array, wherein an array shape is square, and each of the metasurface elements is composed of a square ring and a square patch embedded in the square ring;

the metasurface elements comprise first metasurface elements and second metasurface elements, wherein metasurface elements at four corners of the square are the first metasurface elements, and metasurface elements at other positions of the square are the second metasurface elements; and the metasurface structure uses a differential feed mode, each of the first metasurface elements is connected with an inner core of a coaxial line, and the reflecting plate is connected with an outer core of the coaxial line to realize dual-polarization radiation.

2. The low-profile dual-band aperture-shared antenna according to claim 1, wherein square patch sizes of the second metasurface elements and the first metasurface elements are different, and a high-frequency transmission performance of the metasurface structure is controlled by adjusting square patch sizes of two metasurface elements.

3. The low-profile dual-band aperture-shared antenna according to claim 2, wherein each of the first metasurface elements is provided with an annular groove.

4. The low-profile dual-band aperture-shared antenna according to claim 1, wherein the rectangular parasitic strips are four, and four rectangular parasitic strips are rotationally symmetrically arranged around the metasurface structure.

5. The low-profile dual-band aperture-shared antenna according to claim 4, wherein the high-frequency antenna radiating element, the metasurface structure, the four rectangular parasitic strips and the reflecting plate are symmetrical about a same axis.

6. The low-profile dual-band aperture-shared antenna according to claim 1, wherein the high-frequency antenna radiating element is a dipole antenna.

7. The low-profile dual-band aperture-shared antenna according to claim 1, wherein a height of the metasurface structure from the reflecting plate is $0.1\lambda_L$, and $\lambda_L$ is a free space wavelength of a lowest frequency point of low frequency.

8. A communication device, comprising the low-profile dual-band aperture-shared antenna according to claim 1.

* * * * *